United States Patent
Hiratsuka et al.

(10) Patent No.: US 6,526,396 B1
(45) Date of Patent: Feb. 25, 2003

(54) PERSONAL IDENTIFICATION METHOD, PERSONAL IDENTIFICATION APPARATUS, AND RECORDING MEDIUM

(75) Inventors: Seiichi Hiratsuka, Tokyo (JP); Satoru Yano, Kawasaki (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/461,414

(22) Filed: Dec. 16, 1999

(30) Foreign Application Priority Data

Dec. 18, 1998 (JP) .......................................... 10-361629

(51) Int. Cl.⁷ ................................................ G06F 9/44
(52) U.S. Cl. ........................ 706/52; 382/115; 382/116; 382/124
(58) Field of Search ................................ 706/52, 46, 11

(56) References Cited

U.S. PATENT DOCUMENTS

| | | | |
|---|---|---|---|
| 6,160,903 A | * 12/2000 | Hamid et al. | 382/115 |
| 2001/0016055 A1 | * 8/2001 | Harkless et al. | 382/115 |

FOREIGN PATENT DOCUMENTS

| | | |
|---|---|---|
| JP | 63-149777 | 6/1988 |
| JP | 4-320583 | 11/1992 |
| JP | 6-208611 | 7/1994 |
| JP | 8-115422 | 5/1996 |
| JP | 8-185519 | 7/1996 |
| TW | 85102230 | 2/1996 |
| TW | 307849 | 6/1997 |

OTHER PUBLICATIONS

Kay Moseley et al; Access Control and Monitoring in a Prison Environment,; May 1998; IEEE; 0–7803–4535–5/98; 126–130.*

Japanese Office Action, dated Jan. 9, 2001, with English language translation of Japanese Examiner's comments.

Japanese Office Action, dated Jan. 11, 2000, with English language translation of Japanese Examiner's comments.

Taiwanese Patent Office Action dated Oct. 7, 2002 with Japanese and English Translation.

Chao–hung Wang, "An Automatic Imaging System for Evaluating the Particles on Microstructure Surface"; Jun. 7, 1996; pp. 30–32 with Japanese translation.

* cited by examiner

Primary Examiner—Thomas Black
Assistant Examiner—Joseph P. Hirl
(74) Attorney, Agent, or Firm—Whitham, Curtis & Christofferson, P.C.

(57) ABSTRACT

The present invention relates to improving the identification rate for a person without lowering the rate of excluding another person probabilistically. The invention is a personal identification system that finds the verification results of feature data extracted form data showing the physical features of the individual who is the verification source against the pre-registered feature data of the verification object, and identifies the individual by whether or not the degree of similarity obtained by the verification results exceeds a separate threshold value set according to pre-registered feature data, and wherein a separate threshold value calculation device 23 is provided that calculates the separate threshold value based on the verification score distribution of feature data extracted from data showing the physical features of the individual who is the verification source and the corresponding feature data, and the verification score distribution of the feature data extracted from data showing the physical features of the individual who is the verification source and non-corresponding feature data.

15 Claims, 9 Drawing Sheets

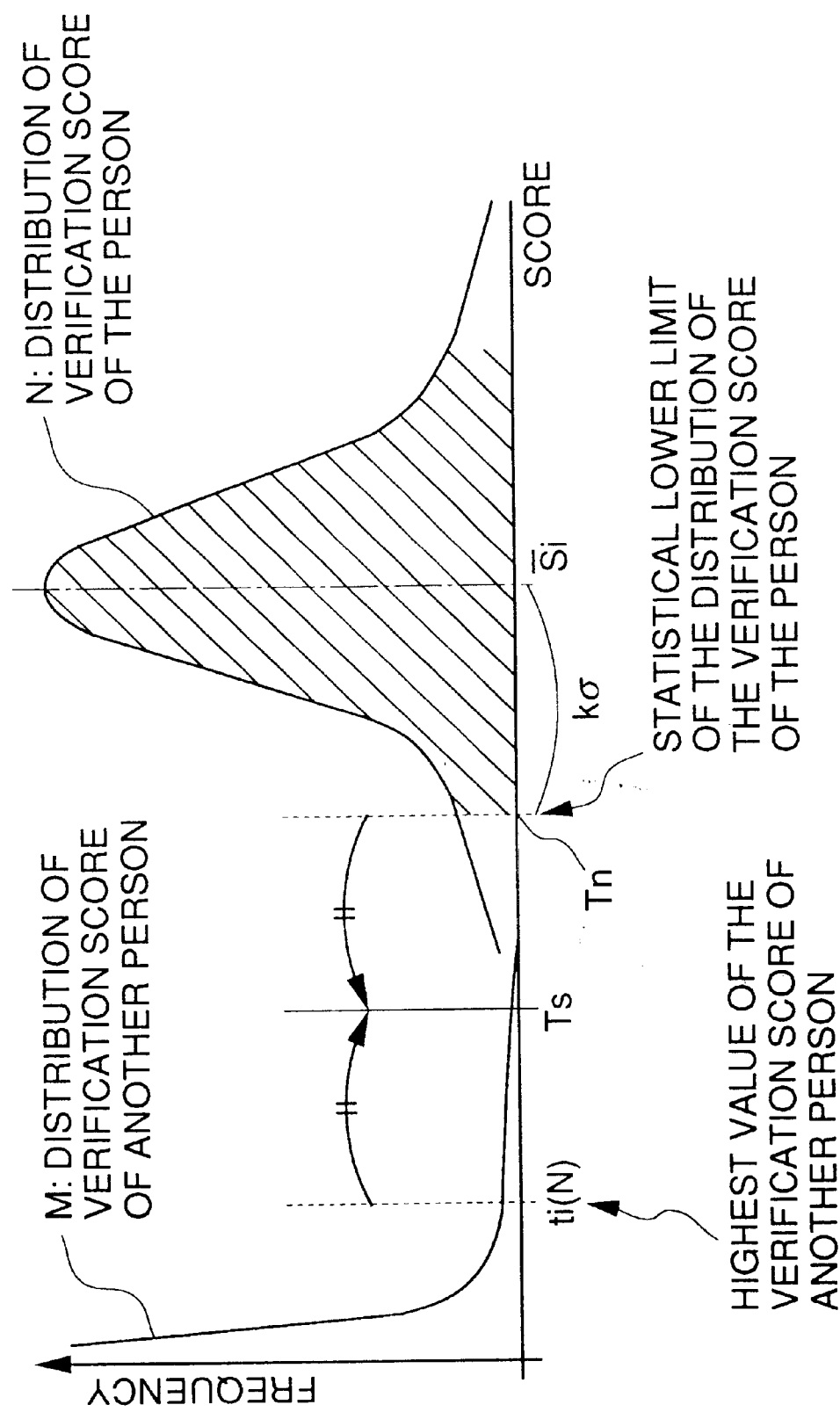

PERSONAL IDENTIFICATION METHOD, PERSONAL IDENTIFICATION APPARATUS, AND RECORDING MEDIUM

BACKGROUND OF THE INVENTION

1. Field of the Invention

The present invention relates to a personal identification method, a personal identification apparatus, and a computer readable recording medium that stores a program for realizing the functions of the personal identification apparatus, wherein, in personal identification using data indicating physical features, such as finger prints, of the subject, the determination of identification is carried out using as a reference the degree of similarity of these physical features.

2. Description of the Related Art

The personal certification method using a plurality of individual physical features (Japanese Unexamined Patent Application, First Publication, No. Hei 8-16788) is an example of a conventional personal identification method. This method reads a plurality of individual features such as voice, finger prints, and handwriting, partitions the read feature parameters into a plurality of categories that reflect these individual features, unifies each of the partitioned categories by applying a weight depending on the ease of the recognition of these individual features, unifies each feature parameter obtained by this unification by applying a weight depending on the ease of the recognition of these individual features, and carries out recognition of the subject by comparing these unified results with threshold values.

In addition, the fingerprint verification apparatus disclosed in Japanese Unexamined Patent Application, First Publication, No. Hei 10-124669, is a personal recognition apparatus. This fingerprint verification apparatus outputs an image signal by optically extracting a fingerprint, converts this image signal into fingerprint image data, extracts fingerprint feature quantities from this fingerprint image data, and outputs the code label of the closest code vector to one frame of this fingerprint feature quantity. Thereby, one sequence of a quantified code sequence for one sequence of fingerprint feature quantity is found, a statistical probability model is inferred using this quantified code sequence, an acceptance probability of the symbol sequence of the identified fingerprint is found by the statistical probability models of each registered finger, and if the acceptance probability exceeds a preset threshold, the person who is the object of the identification is determined to be the registered person.

Furthermore, the fingerprint sensor disclosed in Japanese Unexamined Patent Application, First Publication, No. Hei 8-138046, is a personal identification apparatus. This fingerprint sensor determines whether or not the fingerprint is that of the person based on the correlation output obtained by calculating the optical correlation between reflected light that contains the ridges of the fingerprint obtained on the reflective surface of a prism with which the part of a finger having the fingerprint is in contact, and a fingerprint image registered in advance as being that of the person. A Fourier spectrum integration value detection device that detects the integral value of the Fourier spectrum of the reflected light and a correlation output central value detection device that detects the peak value or integral value of this correlation output are provided, the ratio of the Fourier spectrum integral value of the reflected light and the peak value or integral value of this correlation output serves as the decision value, and by comparing this decision value with a predetermined threshold value, determines whether or not the person is the person to be identified.

In the conventional personal identification methods and personal identification apparatuses described above, the verification threshold value for identifying whether or not the person is the person to be identified uses a constant value. This is because the setting of the verification threshold value is difficult.

In the conventional personal identification methods and personal identification apparatuses described above, because the verification value for determining whether the person is the person to be identified or not uses a constant value, by setting the verification threshold value high, the danger of identifying the person to be identified as another person is decreased, but, for example, in the case of using the fingerprint as the data showing the physical feature of the individual, if fingerprints of sufficient quality cannot be obtained, the person to be identified will not be identified as that person, even though the person is the person to be identified.

Contrariwise, when the verification threshold value is set low, in the case that the fingerprint quality is not high, the person can be identified, but there is the problem that the next time a different person may be mistaken for that person.

SUMMARY OF THE INVENTION

In consideration of these problems, it is an object of the present invention to provide a personal identification method, a personal identification apparatus, and a recording medium that sets various separate threshold values for each of the feature data extracted from the data representing the physical features of the individual without decreasing the probability of excluding other people and improving the identification rate of the person.

A first aspect of the present invention is a personal identification method that finds the verification result of feature data extracted from input data showing the physical features of the individual who is the verification source and pre-registered feature data of the verification object, and identifies the individual by whether or not the degree of similarity obtained by the verification results exceeds a separate threshold value set to correspond to pre-registered feature data, and wherein this individual threshold value is calculated based on the verification score distribution of the feature data extracted from the data showing the physical features of the individual who is the verification source and the corresponding feature data, and the verification score distribution between the feature data extracted from the data showing the physical features of the individual who is the verification source and the non-corresponding verification data.

According to the first aspect of the invention, because of this personal identification method that finds the verification result of feature data extracted from input data showing the physical features of the individual who is the verification source and pre-registered feature data of the verification object, and identifies the individual by whether or not the degree of similarity obtained by the verification results exceeds a separate threshold value set to correspond to pre-registered feature data, and wherein this individual threshold value is calculated based on the verification score distribution of the feature data extracted from the data showing the physical features of the individual who is the verification source and the corresponding feature data, and the verification score distribution between the feature data extracted from the data showing the physical features of the individual who is the verification source and the non-corresponding verification data., identification of the individual is possible even in the case that the quality of the input data showing the physical characteristics of the individual who is the verification source is low and the verification score of the pre-registered feature data of the verification object is low.

A second aspect of the invention is a personal identification method that finds the verification result of feature data extracted from input data showing the physical features of the individual who is the verification source and pre-registered feature data of the verification object, and identifies the individual by whether or not the degree of similarity obtained by the verification results exceeds a separate threshold value set to correspond to pre-registered feature data, and wherein the verification result of the feature data extracted from the data showing the physical features of the individual who is the verification source and all pre-registered feature data is found, and the verification score showing the verification results and the separate threshold value data set depending on each type of pre-registered feature data are compared in sequence, and the individual is identified based on this comparison results.

According to the second aspect of the invention, because the verification result of the feature data extracted from the data showing the physical features of the individual who is the verification source and all pre-registered feature data is found, and the verification score showing the verification results and the separate threshold value data set depending on each type of pre-registered feature data are compared in sequence, and the individual is identified based on this comparison results, inputting in advance the designated data (ID data) that specifies the individual feature data of the verification object is unnecessary.

A third aspect of the invention is a personal identification method according to the first and second aspects, wherein the separate threshold values are set at the median value of the highest score of the degree of resemblance calculated when verifying the feature data extracted from the data showing the physical features of the individual who is the verification source and the non-corresponding data, and the lowest score in the verification score distribution which is expected to be obtainable for the feature data extracted from the data showing the physical features of the individual who is the verification source.

According to the third aspect of the invention, in the personal identification method according to the first and second aspects, because the separate threshold values are set as the median score of the highest score of the degree of resemblance calculated when verifying the feature data extracted from the data showing the physical features of the individual who is the verification source and the non-corresponding data, and the lowest score in the verification score distribution which is expected to be obtainable for the feature data extracted from the data showing the physical features of the individual who is the verification source, by producing the separate threshold values for data showing the registered feature data depending on the quality of the input data showing the physical features of the individual who is the verification source, it is possible to carry out a determination of acceptance in the personal identification in line with the score characteristics of the feature data extracted from the data showing the physical features of the respective individuals.

A fourth aspect of the invention is a personal identification method according to the first through third aspects, wherein the separate threshold values are updated based on the verification results of the feature data extracted from the data showing the physical features of the individual who is the verification source and the pre-registered feature data.

According to the fourth aspect of the invention, in the personal identification method according to the first through third aspects, because the separate threshold values are updated based on the verification results of the feature data extracted from the data showing the physical features of the individual who is the verification source and the pre-registered feature data, it is possible to set the separate threshold values when carrying out personal identification at optimal values.

The fifth aspect of the present invention is a personal identification method that finds the verification result of feature data extracted from input data showing the physical features of the individual who is the verification source and pre-registered feature data of the verification object, and identifies the individual by whether or not the degree of similarity obtained by the verification results exceeds a separate threshold value set to correspond to pre-registered feature data, and wherein a separate threshold value calculation device is provided that calculates the separate threshold values based on the verification score distribution of the feature data extracted from the data showing the physical features of the individual who is the verification source and the corresponding feature data, and the verification score distribution of the feature data extracted from the data showing the physical features of the individual who is the verification source and the non-corresponding feature data.

According to the fifth aspect of the invention, because of a personal identification method that finds the verification result of feature data extracted from input data showing the physical features of the individual who is the verification source and pre-registered feature data of the verification object, and identifying the individual by whether or not the degree of similarity obtained by the verification results exceeds a separate threshold value set to correspond to pre-registered feature data, and wherein a separate threshold value calculation device is provided that calculates the separate threshold values based on the verification score distribution of the feature data extracted from the data showing the physical features of the individual who is the verification source and the corresponding feature data, and the verification score distribution of the feature data extracted from the data showing the physical features of the individual who is the verification source and the non-corresponding feature data, identification of the individual is possible even in the case that the quality of the input data showing the physical characteristics of the individual who is the verification source is low and the verification score of the pre-registered feature data of the verification object is low.

A sixth aspect of the invention has an input device that inputs designated data that specifies data showing physical features of the individual and pre-registered feature data of the verification object, a memory device that stores the feature data sets that are extracted from the data showing the physical features of the individual and the separate threshold value data sets that are set according to the respective character data sets, and a data processing device that extracts a plurality of feature data from the data showing the physical features of a plurality of individuals input by the input device during registration, determines the feature data that is to be registered based on the verification results between the plurality of feature data, calculates the separate threshold values by verifying the feature data to be registered and the pre-registered feature data and carrying out statistical processing on the verification data, stores in the memory device the feature data to be registered and the separate threshold value data, and at the same time extracts feature data of the verification source from the data showing the physical features of the individual input from the input device during verification, reads from the memory device the pre-registered feature data of the verification object based on the designated data, verifying the feature data of the verification source and the pre-registered feature data of the verification object, and carries out the identification of the individual based on the comparison results of the separate threshold data read from the memory device based on the verification scores showing the verification results and the designated data.

According to the sixth aspect, because of the data processing device that extracts a plurality of feature data from the data showing the physical features of a plurality of individuals input by the input device during registration, determines the feature data that is to be registered based on the verification results between the plurality of feature data, calculates the separate threshold values by verifying the feature data to be registered and the pre-registered feature data and carrying out statistical processing on the verification data, stores in the memory device the feature data to be registered and the separate threshold value data, and at the same time extracts feature data of the verification source from the data showing the physical features of the individual input from the input device during verification, reads from the memory device the pre-registered feature data of the verification object based on the designated data, verifying the feature data of the verification source and the pre-registered feature data of the verification object, and carries out the identification of the individual based on the comparison results of the separate threshold data read from the memory device based on the verification score showing the verification results and the designated data, identification of the individual is possible even in the case that the quality of the input data showing the physical characteristics of the individual who is the verification source is low and the verification score of the pre-registered feature data of the verification object is low.

A seventh aspect of the invention has an input device that inputs data that specifies data showing physical features of the individual and a memory device that stores the feature data sets that are extracted from the data showing the physical features of the individual and the separate threshold value data sets that are set according to the respective character data sets, and a data processing device that extracts a plurality of feature data from the data showing the physical features of a plurality of individuals input by the input device during registration, determines the feature data that is to be registered based on the verification results between the plurality of feature data, calculates the separate threshold values by verifying the feature data to be registered and the pre-registered feature data and carrying out statistical processing on the verification data, stores in the memory device the feature data to be registered and the separate threshold value data, and at the same time extracts feature data of the verification source from the data showing the physical features of the individual input from the input device during verification, reads from the memory device in sequence all read pre-registered feature data of the verification object, verifies the feature data of the verification source and the pre-registered feature data of the verification object, totals the comparison results of the verification score showing the verification results and the separate threshold data corresponding to the pre-registered feature data read from the memory device, and carries out the identification of the individual based on summation results.

According to the seventh aspect, because of the data processing device that extracts a plurality of feature data from the data showing the physical features of a plurality of individuals input by the input device during registration, determines the feature data that is to be registered based on the verification results between the plurality of feature data, calculates the separate threshold values by verifying the feature data to be registered and the pre-registered feature data and carrying out statistical processing on the verification data, stores in the memory device the feature data to be registered and the separate threshold value data, and at the same time extracts feature data of the verification source from the data showing the physical features of the individual input from the input device during verification, reads from the memory device in sequence all pre-registered feature data of the verification object, verifies the feature data of the verification source and the read pre-registered feature data of the verification object, totals the comparison results of the verification score showing the verification results and the separate threshold data corresponding to the pre-registered feature data read from the memory device, and carries out the identification of the individual based on the summation results, inputting in advance the designated data (ID data) that specifies the individual feature data of the verification object is unnecessary.

An eighth aspect of the invention is a personal identification apparatus according to the sixth aspect wherein the data processing device verifies the feature data of the verification source and the read pre-registered feature data of the verification object, and updates the separate threshold value data based on the comparison results of separate threshold data read from the memory device based on the verification score showing the verification results and the designated data.

According to the eighth aspect of the invention, because of the personal identification apparatus according to the sixth aspect wherein the data processing device verifies the feature data of the verification source and the read pre-registered feature data of the verification object, and updates the separate threshold value data based on the comparison results of separate threshold data read from the memory device based on the verification score showing the verification results and the designated data, it is possible to set the separate threshold values when carrying out personal identification at optical values.

A ninth aspect of the invention is a personal identification apparatus according to any of the fifth through eighth aspects, wherein the separate threshold values are set at the median value of the highest score of the degree of resemblance calculated when verifying the feature data extracted from the data showing the physical features of the individual who is the verification source and the non-corresponding data, and the lowest score in the verification score distribution which is expected to be obtainable for the feature data extracted from the data showing the physical features of the individual who is the verification source.

According to the ninth aspect of the invention, because the separate threshold values are set as the median score of the highest score of the degree of resemblance calculated when verifying the feature data extracted from the data showing the physical features of the individual who is the verification source and the non-corresponding data, and the lowest score in the verification score distribution which is expected to be obtainable for the feature data extracted from the data showing the physical features of the individual who is the verification source, by producing the separate threshold values for the registered feature data depending on the quality of the input data showing the physical features of the individual who is the verification source, it is possible to carry out a determination of acceptance in the personal identification in line with the score characteristics of the feature data extracted from the data showing the physical features of the respective individuals.

A tenth aspect of the invention is a computer readable recording medium that stores a program that can realize the functions of a personal identification apparatus that finds the verification result of feature data extracted from input data showing the physical features of the individual who is the verification source and pre-registered feature data of the verification object, and identifies the individual by whether or not the degree of similarity obtained by the verification results exceeds a separate threshold value set to correspond to pre-registered feature data, and a computer readable medium records a program for realizing the features of the personal identification apparatus having a separate threshold value calculation device that calculates this separate threshold value based on the verification score distribution of the feature data extracted from the data showing the physical features of the individual who is the verification source and the corresponding feature data, and the verification score distribution between the feature data extracted from the data showing the physical features of the individual who is the verification source and the non-corresponding verification data.

According to the tenth aspect of the invention, because of a personal identification apparatus that finds the verification result of feature data extracted from input data showing the physical features of the individual who is the verification source and pre-registered feature data of the verification object, and identifies the individual by whether or not the degree of similarity obtained by the verification results exceeds a separate threshold value set to correspond to pre-registered feature data, and a computer readable medium records a program for realizing the features of the personal identification apparatus having a separate threshold value calculation device that calculates this separate threshold value based on the verification score distribution of the feature data extracted from the data showing the physical features of the individual who is the verification source and the corresponding feature data, and the verification score distribution between the feature data extracted from the data showing the physical features of the individual who is the verification source and the non-corresponding verification data., by reading into a computer system a program recorded on this recording medium and executing it, identification of the individual is possible even in the case that the quality of the input data showing the physical characteristics of the individual who is the verification source is low and the verification score of the pre-registered feature data of the verification object is low.

An eleventh aspect of the invention is a computer readable recording medium that stores a program for realizing the functions of a personal identification apparatus having an input device that inputs designated data that specifies data showing physical features of the individual and pre-registered feature data of the verification object, a memory device that stores the feature data sets that are extracted from the data showing the physical features of the individual and the separate threshold value data sets that are set according to the respective character data sets, and a data processing device that extracts a plurality of feature data from the data showing the physical features of a plurality of individuals input by the input device during registration, determines the feature data that is to be registered based on the verification results between the plurality of feature data, calculates the separate threshold values by verifying the feature data to be registered and the pre-registered feature data and carrying out statistical processing on the verification data, stores in the memory device the feature data to be registered and the separate threshold value data, and at the same time extracts feature data of the verification source from the data showing the physical features of the individual input from the input device during verification, reads from the memory device the pre-registered feature data of the verification object based on the designated data, verifying the feature data of the verification source and the pre-registered feature data of the verification object, and carries out the identification of the individual based on the comparison results of the separate threshold data read from the memory device based on the verification score showing the verification results ant the designated data.

According to the eleventh aspect of the invention, because of a computer readable recording medium that stores a program for realizing the functions of a personal identification apparatus having an input device that inputs designated data that specifies data showing physical features of the individual and pre-registered feature data of the verification object, a memory device that stores the feature data sets that are extracted from the data showing the physical features of the individual and the separate threshold value data sets that are set according to the respective character data sets, and a data processing device that extracts a plurality of feature data from the data showing the physical features of a plurality of individuals input by the input device during registration, determines the feature data that is to be registered based on the verification results between the plurality of feature data, calculates the separate threshold values by verifying the feature data to be registered and the pre-registered feature data and carrying out statistical processing on the verification data, stores in the memory device the feature data to be registered and the separate threshold value data, and at the same time extracts feature data of the verification source from the data showing the physical features of the individual input from the input device during verification, reads from the memory device the pre-registered feature data of the verification object based on the designated data, verifying the feature data of the verification source and the pre-registered feature data of the verification object, and carries out the identification of the individual based on the comparison results of the separate threshold data read from the memory device based on the verification score showing the verification results and the designated data, by reading into a computer system a program recorded on this recording medium and executing it, identification of the individual is possible even in the case that the quality of the input data showing the physical characteristics of the individual who is the verification source is low and the verification score of the pre-registered feature data of the verification object is low.

A twelfth aspect of the invention is a computer readable recording medium that stores a program for realizing the functions of a personal identification apparatus having an input device that inputs designated data that specifies data showing physical features of the individual and pre-registered feature data of the verification object, a memory device that stores the feature data sets that are extracted from the data showing the physical features of the individual and the separate threshold value data sets that are set according to the respective character data sets, and a data processing device that extracts a plurality of feature data from the data showing the physical features of a plurality of individuals input by the input device during registration, determines the feature data that is to be registered based on the verification results between the plurality of feature data, calculates the separate threshold values by verifying the feature data to be registered and the pre-registered feature data and carrying out statistical processing on the verification data, stores in the memory device the feature data to be registered and the separate threshold value data, and at the same time extracts feature data of the verification source from the data showing the physical features of the individual input from the input device during verification, reads from the memory device the pre-registered feature data of the verification object based on the designated data, verifying the feature data of the verification source and the pre-registered feature data of the verification object, and carries out the identification of the individual based on the comparison results of the separate threshold data.

According to the twelfth aspect of the invention, because of recording on a computer readable medium a program for realizing the functions of a personal identification apparatus having an input device that inputs designated data that specifies data showing physical features of the individual and pre-registered feature data of the verification object, a memory device that stores the feature data sets that are extracted from the data showing the physical features of the individual and the separate threshold value data sets that are set according to the respective character data sets, and a data processing device that extracts a plurality of feature data from the data showing the physical features of a plurality of individuals input by the input device during registration, determines the feature data that is to be registered based on the verification results between the plurality of feature data, calculates the separate threshold values by verifying the feature data to be registered and the preregistered feature data and carrying out statistical processing on the verification data, stores in the memory device the feature data to be registered and the separate threshold value data, and at the same time extracts feature data of the verification source from the data showing the physical features of the individual input from the input device during verification, reads from the memory device the pre-registered feature data of the verification object based on the designated data, verifying the feature data of the verification source and the pre-registered feature data of the verification object, and carries out the identification of the individual based on the comparison results of the separate threshold data, by reading into a computer system a program recorded on this recording medium and executing it, inputting in advance the designated data (ID data) that specifies the individual feature data of the verification object is unnecessary.

A thirteenth aspect of the invention is a personal identification apparatus according to the sixth aspect having a computer readable recording medium storing a program for realizing the functions of the personal identification apparatus, wherein the data processing device verifies the feature data of the verification source and the pre-registered feature data of the verification object, and updates the separate threshold value data based on the results of a comparison of the verification score showing the verification results and the separate threshold value data read from the memory device based on the designated data.

According to the thirteenth aspect of the invention, because of the personal identification apparatus according to the sixth aspect having a computer readable recording medium storing a program for realizing the functions of the personal identification apparatus, wherein the data processing device verifies the feature data of the verification source and the pre-registered feature data of the verification object, and updates the separate threshold value data based on the results of a comparison of the verification score showing the verification results and the separate threshold value data read from the memory device based on the designated data, by reading the program stored on the recording medium into a computer system and executing it, it is possible to set the separate threshold values to optimal values when carrying out personal identification.

The fourteenth aspect of the invention according to the fifth through eighth aspects is a computer readable recording medium that stores a program for realizing the functions of a personal identification apparatus wherein the separate threshold values are set to the median value of the highest score of the degree of similarity extracted when verifying the feature data extracted from data showing physical features of the individual who is the verification source and the non-corresponding feature data, and the lowest score in the verification score distribution expected to be obtainable for the feature data extracted from the data showing the physical features of the individual who is the verification source.

According to the fourteenth aspect, because of a computer readable recording medium that stores a program for realizing the functions of a personal identification apparatus wherein the separate threshold values are set to the median value of the highest score of the degree of similarity extracted when verifying the feature data extracted from data showing physical features of the individual who is the verification source and the non-corresponding feature data, and the lowest score in the verification score distribution expected to be obtainable for the feature data extracted from the data showing the physical features of the individual who is the verification source, by reading the program stored on the recording medium into a computer system and executing it, it is possible to carry out a determination of acceptance in the personal identification in line with the score characteristics of the feature data extracted from the data showing the physical features of the respective individuals by producing separate threshold values for pre-registered feature data according to the quality of the data showing the physical features of the individual who is the verification source.

BRIEF DESCRIPTION OF THE DRAWINGS

FIG. 11 is a drawing showing the relationship between the verification score distribution of the feature data of the verification source and the non-corresponding feature data, and the verification score distribution of the feature data of the verification source and the corresponding feature data.

PREFERRED EMBODIMENTS

Figure 1:
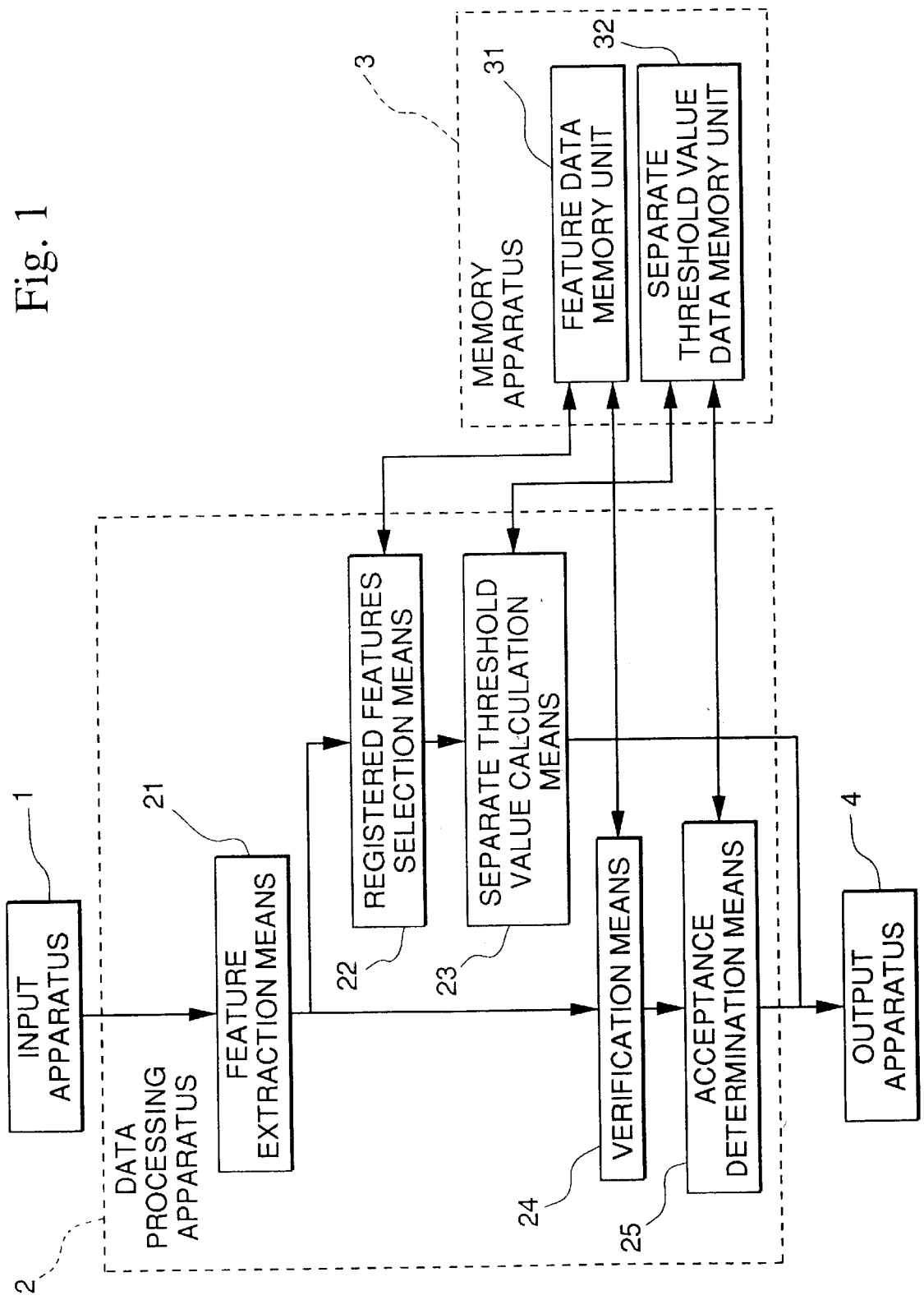
FIG. 1 is a block diagram showing the personal identification apparatus according to the first embodiment of the present invention.

The embodiments of the present invention will be explained referring to the figures. In the embodiments of the present invention, a fingerprint verification system will be treated in the example of a personal identification system. FIG. 1 shows the structure of a fingerprint system that is the personal identification apparatus according to the first embodiment of the present invention. In the figure, the fingerprint verification system has an input apparatus 1, such as a fingerprint reading apparatus, a data processing apparatus 2 that is operated by programmed control, a memory apparatus 3 that stores the necessary data for the fingerprint the verification, and an output apparatus 4 such as a display.

The input apparatus 1 reads the fingerprint as data showing a physical feature of the individual, and converts this to image data. The input apparatus 1 corresponds to the input device of the present invention.

The memory device 3 has a feature data memory unit 31 and a separate threshold separate threshold data memory unit 32.

The feature data memory unit 31 extracts features such as end points and branch points of fingerprints from the fingerprint image data, and stores the quantified feature data. In order to identify individuals, and all feature data in the feature data memory unit 31 are independent of each other.

The separate threshold value data memory unit 32 stores the separate threshold values, that is, the separate threshold value data, corresponding to each set of feature data stored in the feature data memory unit 31.

The data processing apparatus 2 has a feature extraction device 21, a registered feature selection device 22, separate threshold value calculation device 23, a verification device 24, and an acceptance determination device 25. The data processing apparatus 2 corresponds to the data processing device of the present invention.

The feature extraction device 21 extracts and quantifies the features such as the end points and branch points of the fingerprints from the fingerprint image data sent from the input apparatus 1.

The registered feature selection device 22 carries out verification between a plurality of feature data items sent from the feature extraction device 21, and extracts the mean and variance of the verification score. At the same time, from the feature data extracted from the input fingerprint image data, the data with the highest quality is selected and sent to the feature data memory 31.

In addition, the registered feature selection device 22 finds the verification score distribution of the selected feature data of the verification source and the corresponding feature data among the pre-registered feature data, and the verification score distribution of this selected feature data of the verification source and the non-corresponding feature data among the pre-registered feature data. That is, the mean and the variance of the highest score of the selected feature data of the verification source and the non-corresponding feature data, and the verification score of the selected feature data of the verification source and this corresponding feature data are found. Here, corresponding feature data denotes the feature data of a person, and in the case that the data showing the physical features of the individual consists of fingerprints, corresponding feature data denotes the feature data selected from the fingerprint image data of the person. In addition, non-corresponding feature data denotes the feature data of another individual, and in the case that the data showing the physical features of the individual is fingerprint image data, the non-corresponding feature data denotes the feature data for fingerprints of another person.

The separate threshold value calculation device 23 calculates separate threshold values from the mean and variance of the highest value of the verification score of the selected feature data of the verification source calculated by the registered feature selection device 22 and the non-corresponding feature data, and the verification score of this selected feature data of the verification source and the corresponding feature data, and stores this in the separate threshold value data memory unit 32.

The verification device 24 reads the feature data of the verification object registered in the feature data memory unit 31, verifies the read feature data and the feature data provided from the feature extraction device 21, and quantifies the degree of this similarity as the verification score.

The acceptance determination device 25 compares the verification score output by the verification device 24 and the separate threshold value data stored in the separate threshold value data memory unit 32 set depending on the pre-registered feature data of the verification object, and outputs the control data for displaying a message such as "match" on the output apparatus 4 in the case that the separate threshold values are exceeded.

Next, the operation of the fingerprint verification system according to the present embodiment will be explained. First, the registration operation for the feature data will be explained. During registration, the fingerprint image data for the same finger is extracted several times from the input apparatus 1. The number of extractions may be 2 to 10 times, and normally 3 times.

The fingerprint image data extracted by the input apparatus 1 is output to the feature extraction device 21, and in the feature extraction device 21, the feature data is extracted from the fingerprint image data and quantified. The quantified feature data is supplied to the registered feature selection device 22.

In the registered feature selection device 22, verification is carried out between the various multiply extracted feature data, and, for example, based on the results of this the verification, the items with the highest verification score are stored in the feature data memory unit 31 as registered feature data. In addition, verification of the registered data against the pre-registered feature data is carried out, and the highest value of the verification score of the non-corresponding feature data is calculated. Furthermore, the mean and standard deviation of the verification score are calculated, and sent to the separate threshold value calculation device 23 along with the feature data stored in the feature data memory unit 31.

In the separate threshold value calculation device 23, using the highest value of the verification score of the non-corresponding feature data found by the registered feature selection device 22, calculates a separate threshold value $T_S$ by equation (1), and stores this in the separate threshold result data memory unit 32.

$$T_s = t_i(N) + \frac{\overline{S}_i - k\sigma_i - T_i(N)}{2} \quad (1)$$

where $S_i$ is the average value of the verification score of the corresponding feature data, that is, the average value of the verification score of the fingerprint of the person, $\sigma_i$ is the standard deviation of the verification score of the corresponding feature data, that is, the standard deviation of the verification score of the fingerprint of the person, k is a variance parameter, $t_i$ is the highest value of the verification score of the non-corresponding feature data, that is, the highest value of the verification score of the fingerprint of another person.

In equation (1), the separate threshold value $T_S$ denotes setting to the median value the highest score of the degree of similarity calculated when verifying the feature data extracted from the data showing the physical features of the individual who is the verification source and the non-corresponding data, and the lowest score in the verification score distribution that is expected to be obtainable for the feature data extracted from the data showing these physical features of the individual who is the verification source. That is, as shown in FIG. 11, the separate threshold value $T_S$ denotes setting to the median value the highest score $t_i$ (N) of the degree of similarity calculated from the nominal distribution M obtained when verifying the feature data extracted from the fingerprint image data of the person to be verified and the pre-registered feature data extracted from the fingerprint image data of another person, and the lowest verification score Tn of the verification score distribution N expected to be obtained from the person.

Next, the verification operation of the feature data will be explained. The fingerprint image data of the first finger from the input apparatus 1 and the feature number, which is the designated data for specifying the pre-registered feature data of the verification object, are input into the data processing apparatus 2, and sent to the feature extraction device 21.

In the feature extraction device 21, the feature data from the fingerprint image data is extracted and quantified. The quantified feature data is supplied to the verification device 24. In the verification device 24, the pre-registered feature data of the verification object is read from the feature data memory unit 31 using the feature number as a key, and verification is carried out of the feature data extracted from the fingerprint image data input from the input device 1. The verification device 24 sends the score obtained by the verification and the feature number of the verification object to the acceptance determination device 25.

In the acceptance determination device 25, the separate threshold value data is read from the separate threshold value data memory unit 32 using the feature number given by the verification device 24 as a key, and a comparison of this separate threshold value data and the verification score is carried out. As a result of this comparison, when the verification score is larger, control data for displaying the message "match" in the output device 4 is output, and when the verification score is smaller, the control data for displaying the message "mismatch" is output to the output apparatus 4.

Next, the concrete operation of the fingerprint verification system according to the present embodiment is explained referring to FIG. 2 through FIG. 5. First, the operation during registration of the feature data is explained. Fingerprint image data is input three times for the same finger by the input apparatus 1. The three sets of fingerprint image data are sent to the feature extraction device 21, and respective feature data is extracted by the feature extraction device 21 and quantified. Here, the items of quantified feature data are S1, S2, and S3. The items of quantified feature data S1, S2, and S3 are sent to the registered feature selection device 22.

Figure 2:
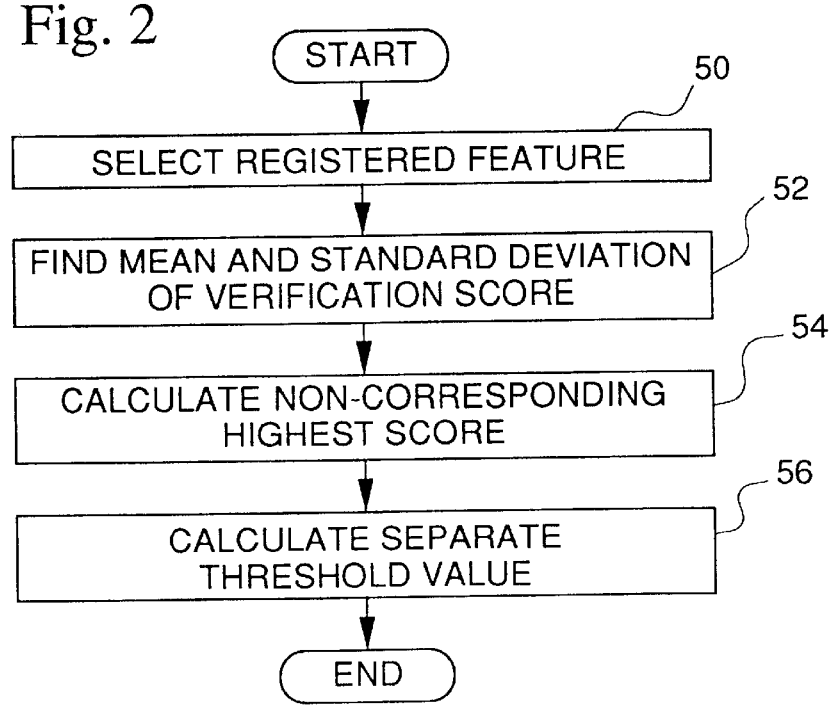
FIG. 2 is a flow chart showing the operation during registration of the feature data in the personal identification apparatus shown in FIG. 1.
Figures 4, 5:
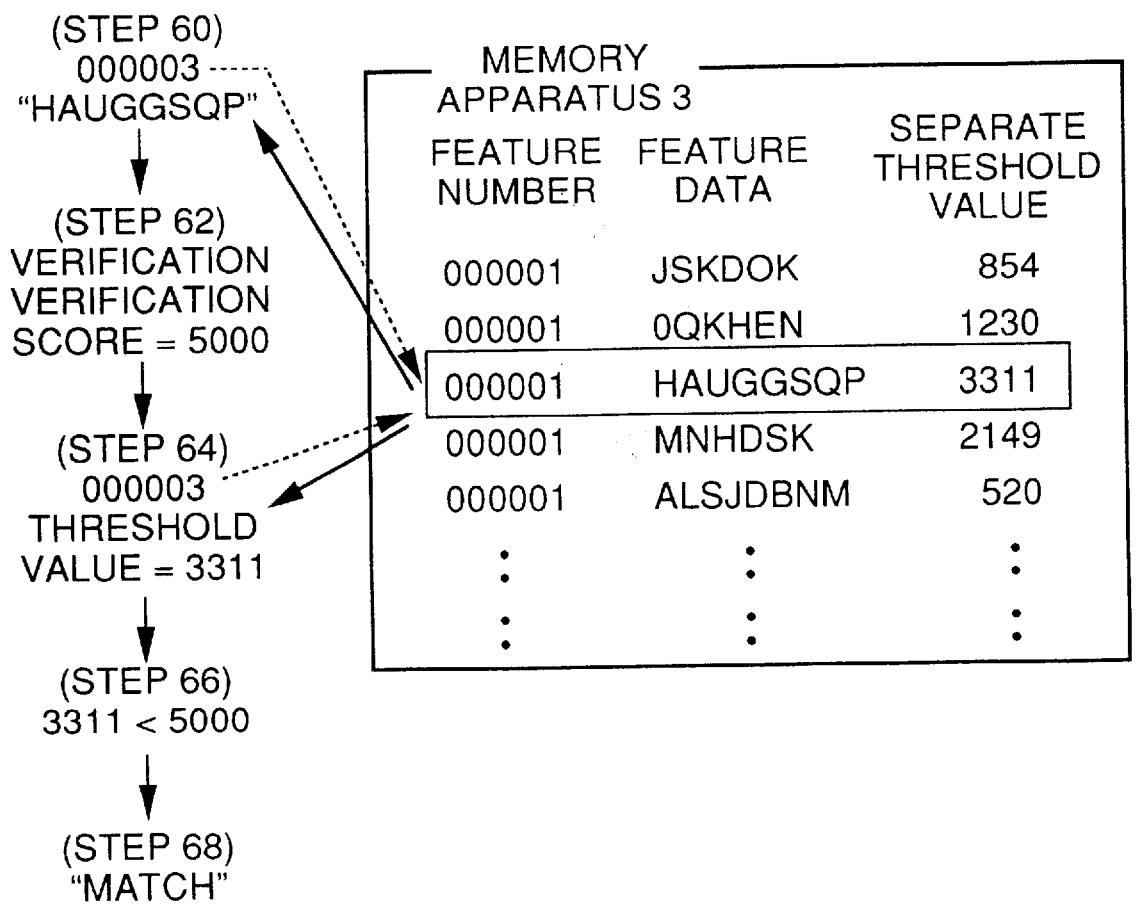
FIG. 4 is an explanatory diagram showing the calculation method of the verification score when selecting feature data from the plurality of feature data in the personal identification apparatus shown in FIG. 1.
FIG. 5 is a flow chart showing a concrete example of the verification operation in the personal identification apparatus shown in FIG. 1.

The registered feature selection device 22 carries out verification between the different input feature data in the sequences, for example, S1 and S2, and S1 and S3, and a verification score is output as shown in FIG. 4. The respective verification scores are calculated, and the highest score serves as the feature data for the registered object (step 50; FIG. 2). In the example shown in FIG. 4, because the integrated value of feature data S1 is the highest at 5500, feature data S1 will serve as the registered object.

The registered feature selection device 22 calculates both mean and standard deviation of the verification score, and the highest value of the verification score of the registered feature data and the non-corresponding feature data registered up to that point (steps 52, 54; FIG. 2). Next, these values are substituted into equation (1), and the separate threshold values are calculated (step 56; FIG. 2). In equation (1), the values of the parameter k are 1 to 3. The calculated separate threshold values are stored in the separate threshold value data memory unit 32.

Figure 3:
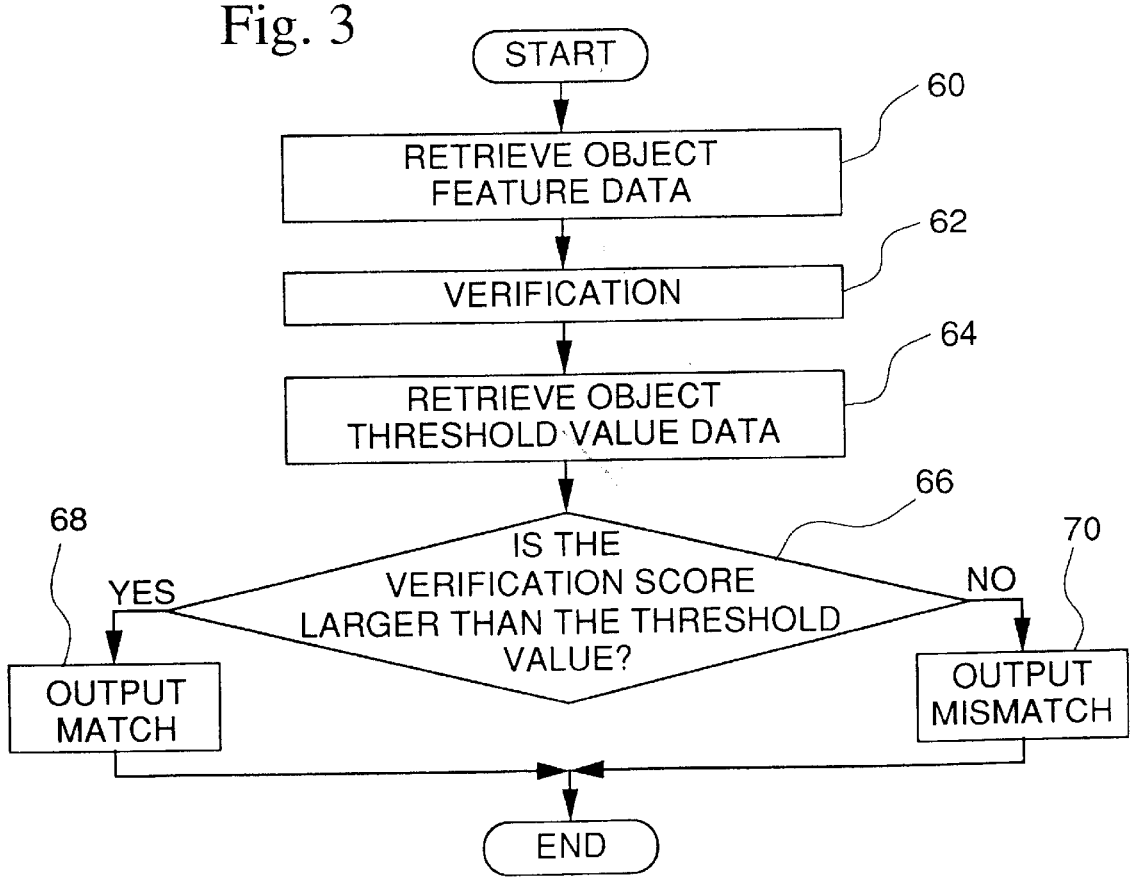
FIG. 3 is a flow chart showing the verification operation in the personal identification apparatus shown in FIG. 1.

Next, the verification operation of the feature data is explained referring the FIG. 3 and FIG. 5. FIG. 5 shows the concrete contents of the flow chart in FIG. 3. As shown in FIG. 5, the feature data and the separate threshold value data are stored in the memory apparatus 3 using the feature number as a key. Here, the feature data input from the feature extracting device 21 is sent to the verification device 24, and the feature number 000003, which is the designated data for retrieving the feature data of the verification object, is sent from the input apparatus.

In FIG. 3 and FIG. 5, in step 60, the verification device 24 retrieves corresponding feature data by using the feature number 000003 from the feature data memory unit 31 as the key. In the verification device 24, the feature data that has been retrieved is verified against the input feature data, and a verification score is calculated (step 62). Here, the calculated verification score is assumed to be 5000, as shown in step 62 of FIG. 5.

Next, in step 64, the acceptance determination device 25 obtains the corresponding separate threshold value 3311 by using feature number 000003 as a key, which specifies the feature data of the verification object from the separate threshold value data memory unit 32. In step 66, the acceptance determination device 25 compares the separate threshold value obtained in step 64 with the verification score. Here, because the verification score of 5000 is larger than the threshold value 3311, the acceptance determination device 25 determines that the feature data that was retrieved and the input feature data agree, and outputs to the output apparatus 4 control data showing the expression "match". As a result, the output apparatus 4 (step 68) displays the message showing "match".

In addition, in step 66, in the case that the verification score is larger than the separate threshold value, the acceptance determination device 25 determines that the feature data that was retrieved and the input feature data do not match, and outputs control data showing the expression "mismatch" to the output apparatus 4. As a result, the message showing the expression "mismatch" is displayed by the output apparatus 4 (step 70).

According to the personal identification apparatus of the first embodiment of the present invention, because the separate threshold values are calculated based on the feature data score distribution extracted from the data showing the physical features of the individual who is the verification source, and the verification score distribution of the feature data extracted from the data showing the physical features of the individual who is the verification source and the non-corresponding feature data, even in the case that the quality of the data showing the physical features of the individual who is the verification source and the verification score with the pre-registered feature data of the verification object is low, it is possible to identify the individual.

In addition, according to the personal identification apparatus of the first embodiment of the present invention, because the separate threshold values are set at the median value of the highest score of the degree of similarity calculated when verifying the feature data extracted from the data showing the physical features of the individual who is the verification source and the non-corresponding data, and the lowest score in the verification score distribution expected to be obtainable for the feature data extracted from the data showing the physical features of the individual who is the verification source, by producing threshold values separately for the registered feature data according to the quality of the input data showing the physical features of the individual who is the verification source, it is possible to carry out acceptance determination in personal identification in line with the score characteristics of the feature data extracted from the data showing the various physical features of the individual.

Figure 6:
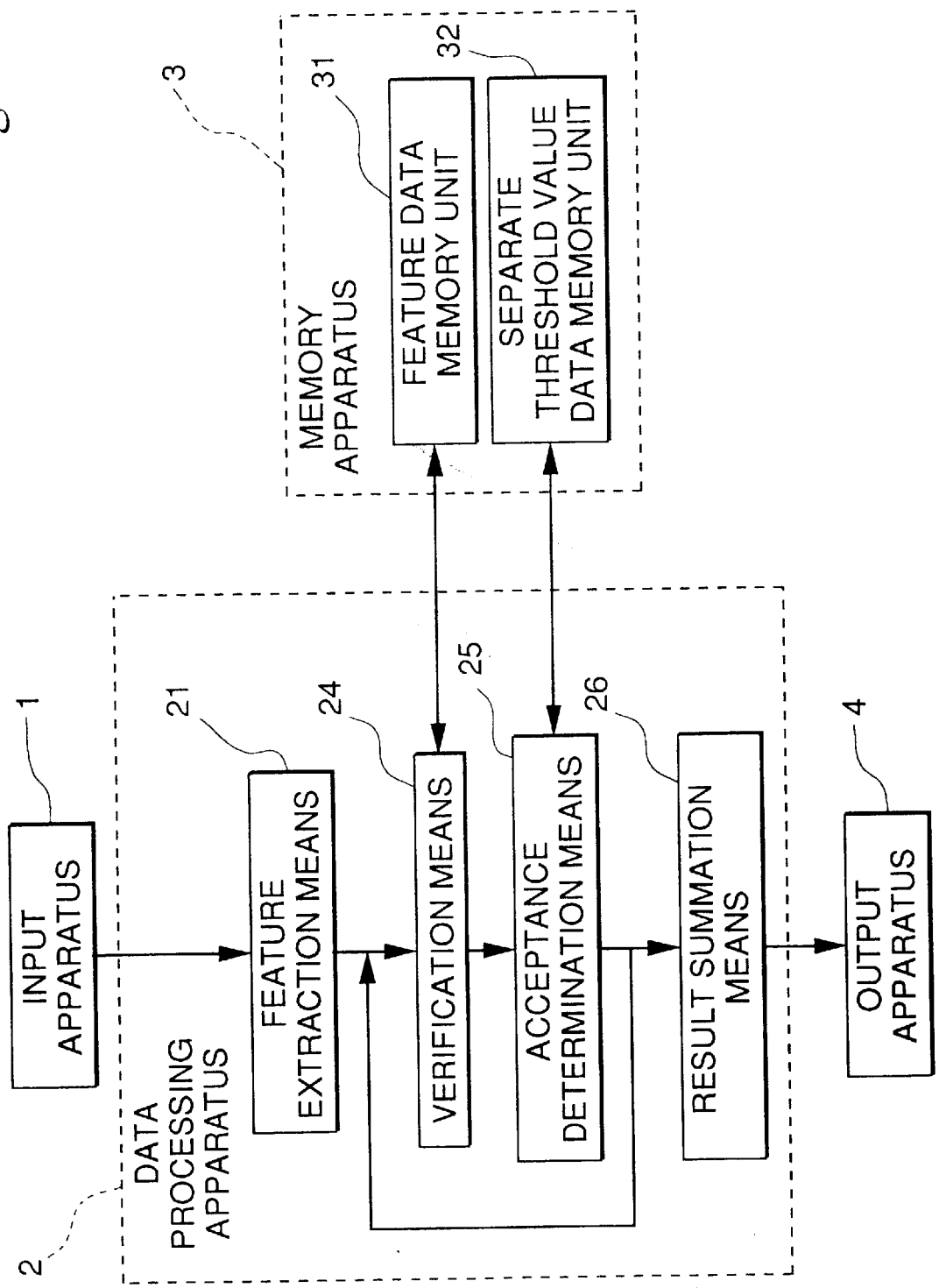
FIG. 6 is a block diagram showing the structure of the personal identification apparatus according the second embodiment of the present invention.

Next, the structure of the fingerprint verification system of a personal identification system according to a second embodiment of the present invention is shown in FIG. 6. As shown in FIG. 6, in the present embodiment, in addition to the structure of the data processing apparatus 2 in the first embodiment, the data processing apparatus 5 differs only in having a result summation device 26, and because the other structures are identical to those of the personal identification apparatus according to the first embodiment, redundant explanations are omitted. Moreover, the registered feature selection device 22 and the separate threshold value calculation device 23 are identical to those shown in FIG. 1, and their explanation is omitted for convenience. Moreover, like the first embodiment, the input apparatus 1 corresponds to the input device of the present invention, and the data processing apparatus 5 corresponds to the data processing device of the present invention.

Next, the structure of a fingerprint verification system as the personal identification apparatus according to the second embodiment of the present invention is shown in FIG. 6. The present embodiment differs from the first invention shown in FIG. 1 on the point that the fingerprint of one finger only is input from the input apparatus 1, and the feature number, which is the designated data for specifying the pre-registered feature data of the verification object, is not input. In FIG. 6, the fingerprint image data obtained from the input device 1 is sent to the feature extraction device 21.

In the feature extraction device 21, the feature is extracted and quantified from the fingerprint image data. The quantified feature data is sent to the verification device 24. In the verification device 24, the pre-registered feature data of the verification object is retrieved and read in sequence from the feature data memory unit 31, verification of the feature data input from the feature extraction device 21 is carried out, and a verification score is calculated (steps 70 and 72).

Next, the acceptance device 25 receives from the verification device the verification score and the feature number that specifies the pre-registered feature data referred to during verification, and separate threshold values set according to each of the items of the pre-registered feature data read during the verification are retrieved (step 74). In addition, the acceptance device 25 compares the size of the verification score found in step 72 and the separate threshold values set according to each set of pre-registered data read during verification, and in case the verification score surpasses the separate threshold values, it is saved in the summation variable (step 78). In steps 70 through 78, this processing is repeated (step 80) until the verification of all feature data included in the feature data memory 31 has completed.

After the verification by the acceptance unit of all of the feature data included in the feature data memory unit 31 is completed, a list of the verified results that are saved in the summation variable are sent to the result summation device 26 by the acceptance device 25.

In the result summation device 26, the data that are saved are summed (step 82). The result summation device 26 determines a "match" or a "mismatch" for the verification results of the fingerprint by whether or not there is data in the summation variable, and outputs the determination result to the output apparatus 4 (steps 84, 86, 88).

Figure 7:
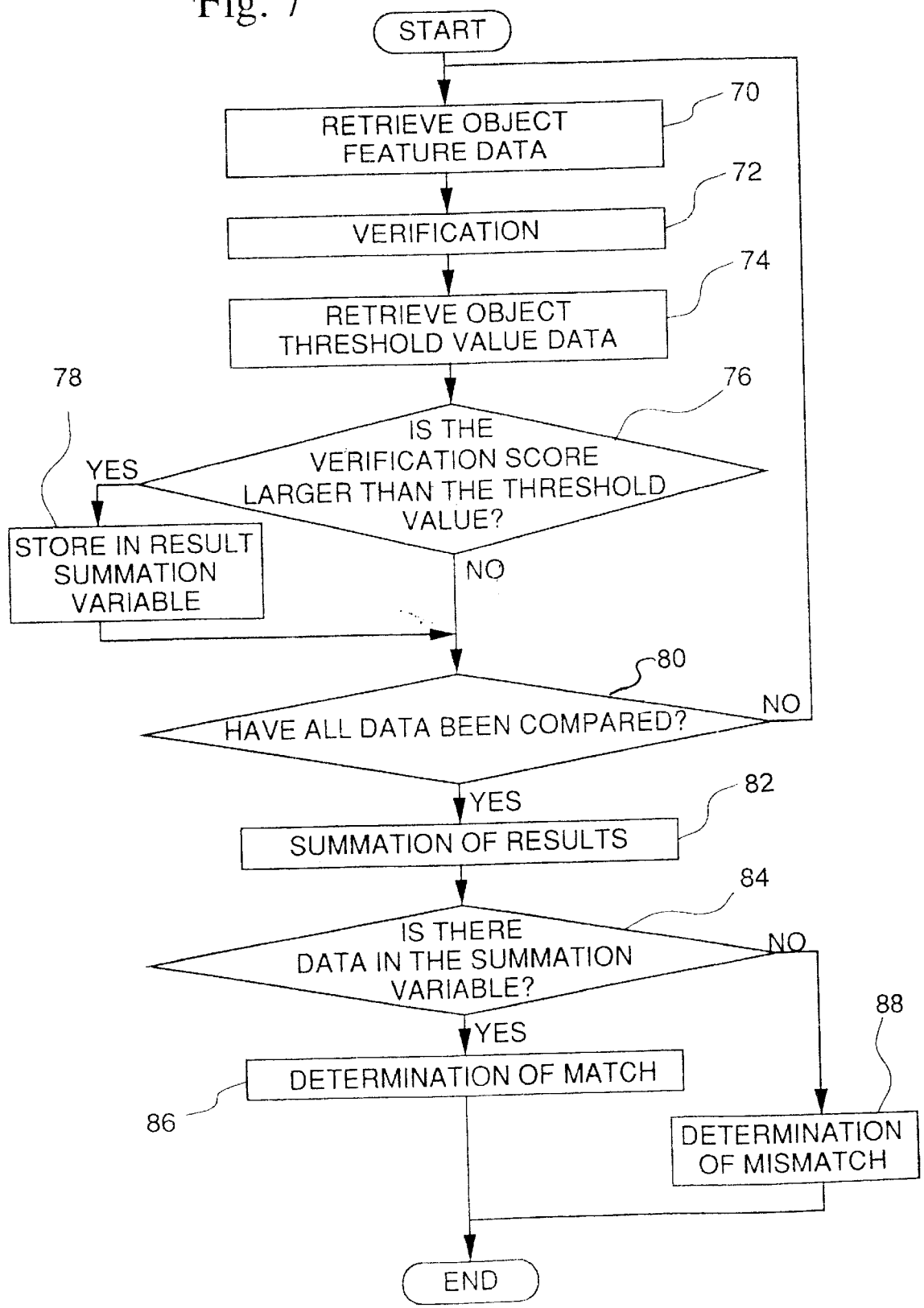
FIG. 7 is a flow chart showing the content of the processing of the personal identification apparatus shown in FIG. 6.
Figure 8:
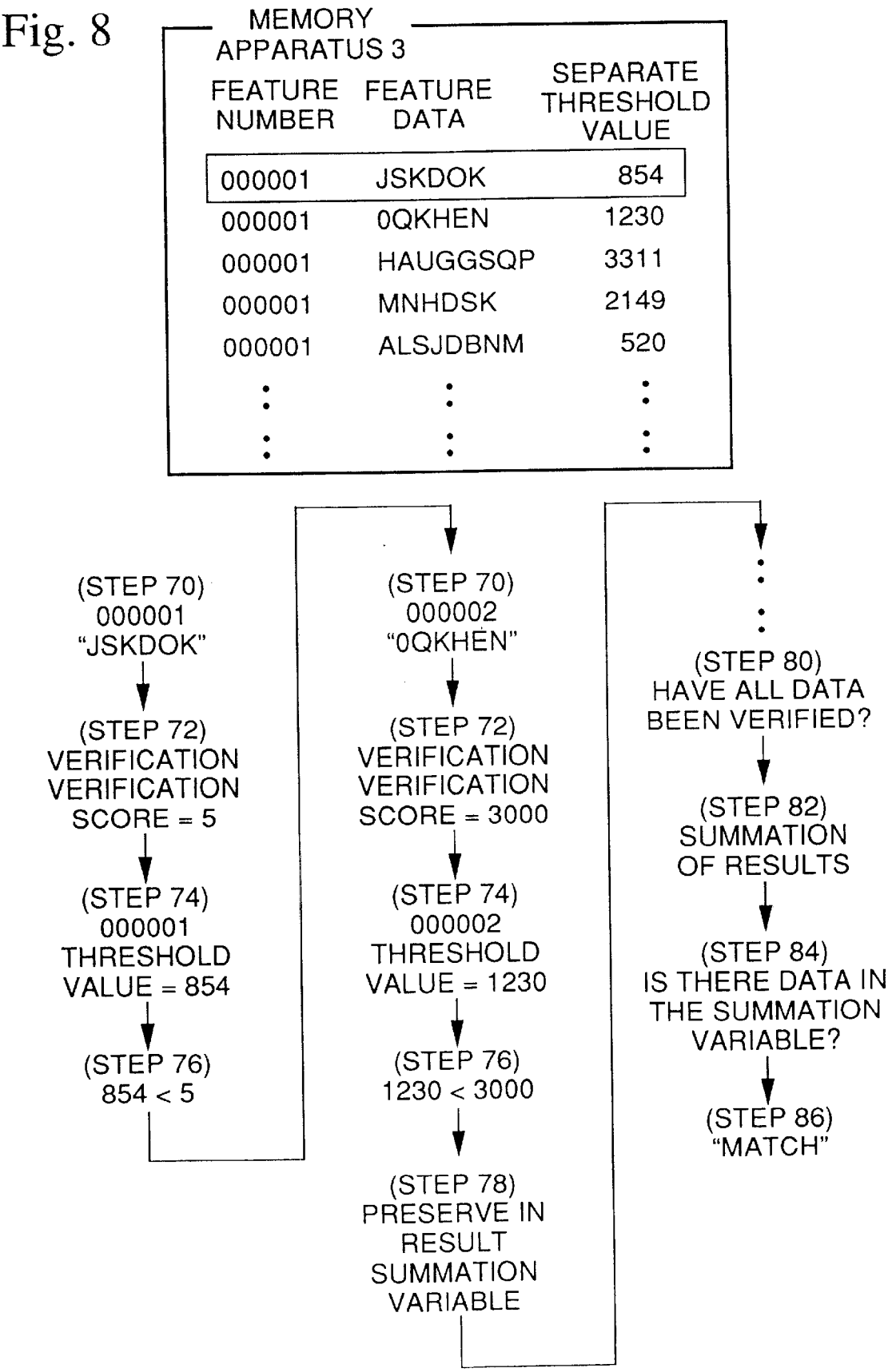
FIG. 8 is a flow chart showing a concrete example of the processing contents of the personal identification apparatus shown in FIG. 6.

Next, the concrete operation of the fingerprint verification system according to the present embodiment is explained referring to FIG. 8. The operation during registration of the feature data is the same as that of the first embodiment, and its explanation is omitted, and the operation during verification is explained. FIG. 8 shows the flow chart shown in FIG. 7 based on this concrete example, and steps having identical reference numerals to the processing steps correspond to the processing steps of the flow in FIG. 7. However, the processing steps corresponding to one part of the processing steps in FIG. 7 are eliminated for convenience of explanation.

As shown in FIG. 8, the feature data and the separate threshold value data are stored in the memory apparatus 3 using the feature number as a key. Here, the input feature data is assumed to be sent from the input apparatus 1. First, in step 70, the feature data 000001 that was first stored is retrieved from the feature data memory unit 31.

In the verification device, the feature data retrieved from the feature data memory unit 31 is verified against the feature data input by the feature extraction device 21, and as a result, the verification score of 5 points is obtained (step 72).

Next, in step 74, the acceptance device 25 retrieves the separate threshold values corresponding to the pre-registered feature data of the verification object whose verification was carried out in step 72 from the separate threshold value data memory unit 32, and here, a separate threshold score of 854 points, corresponding to the first pre-registered feature data, is obtained.

Next, in step 76, the acceptance device 25 carries out a comparison of the size of the separate threshold value obtained in step 74 and the verification score. Here, for the verification score of 5 points, it is determined that there is no match because the separate threshold value is 854 points, the processing returns to step 70, and the next pre-registered feature data is retrieved.

Next, in step 70, the feature data having feature number 000002 is retrieved next from the feature data memory unit 31. In step 72, it is assumed that the verification device 24 verifies the retrieved feature data having feature number 000002 against the feature data input from the feature extraction device 21, and as a result, a verification score of 3000 points is obtained.

Next, in step 74, the acceptance device 25 retrieves from the separate threshold value data memory unit 32 the separate threshold value corresponding to the feature data of the verified object that was verified in step 72, and here, a separate threshold value score of 1230 points, corresponding to the second feature data, is obtained.

Furthermore, in step 76, the acceptance device 25 compares the separate threshold value obtained in step 74 and the verification score obtained in step 72. Here, in contrast to the verification score of 3000 points, the separate threshold value is 1230 points, and because the verification score does not exceed the separate threshold value, it is determined that there is a match between the feature data extracted from the fingerprint image data input from the input device 1 and the second set of feature data retrieved from the separate threshold value data memory unit 32, and the result is stored in the result summation variable (step 78).

The above processes are carried out for all of the feature data stored in the feature data memory device 31. When it has been determined that the above processing has been carried out for all the feature data stored in the feature data memory unit 31 (step 80), the data stored in the result summation variable is sent to the result summation device 26.

In step 82, the result summation device 26 sums the data saved in the summation variable. The result summation device 26 stores the feature data number 000002 in the result summation variable, and thus it is determined that the verification of the fingerprint is a match, and the determination result is output to the output apparatus 4 (steps 84 and 86).

According to the personal identification apparatus according the second embodiment of the present invention, in addition to the results obtained by the personal identification apparatus according to the first embodiment, because the verification results of the feature data extracted from the data showing the physical features of the individual who is the verification source and all pre-registered feature data are found, and in addition, the verification score showing the verification results and the separate threshold value set according to each set of pre-registered feature data are compared in sequence, and the individual is identified based on this comparison result, there is no need to input in advance designated data (ID data) specifying the feature data of the individual who is the verification object, and it is possible to decrease the input load of the specified data.

In addition, according to the personal identification apparatus according to the second embodiment of the present invention, in the case that a plurality of candidates for the pre-registered feature data agreeing with the verification results is output, it is possible to determine that there are multiple registrations of the same finger, and it is possible to check whether or not the same finger has redundant registrations.

Figure 9:
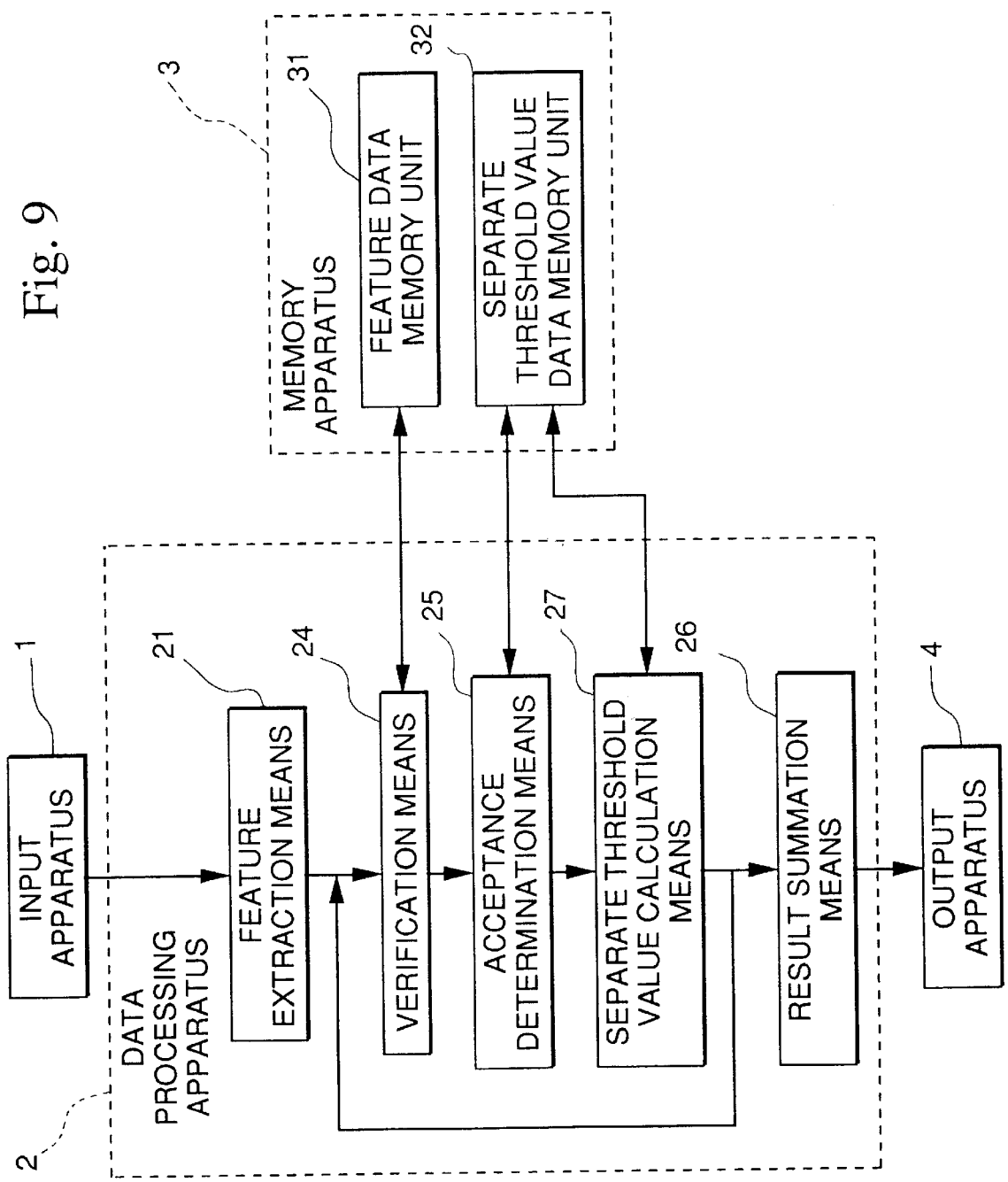
FIG. 9 is a block diagram showing the structure of the personal identification apparatus according to the third embodiment of the present invention.

Next, the structure of a fingerprint verification system that is a personal identification apparatus according to the third embodiment of the present invention will be explained referring to FIG. 9. The fingerprint verification system according to this embodiment differs from the structure of the data processing apparatus 2 in the first embodiment shown in FIG. 1 on the point that in addition the data processing apparatus 6 has a separate threshold value extraction device 27 that updates the separate threshold values set according to the verification result of the feature data extracted from the data showing the physical features of the individual who is the verification source and each set of pre-registered feature data, and a result summation device 26. Moreover, the pre-registered feature selection device 22, which carries out the registration processing, and the separate threshold value calculation device 23 are identical to those in FIG. 1, and their explanation has been omitted for convenience. Moreover, the input device 1 corresponds to the input device and the data processing apparatus 6 corresponds to the data processing device of the present invention.

Figure 10:
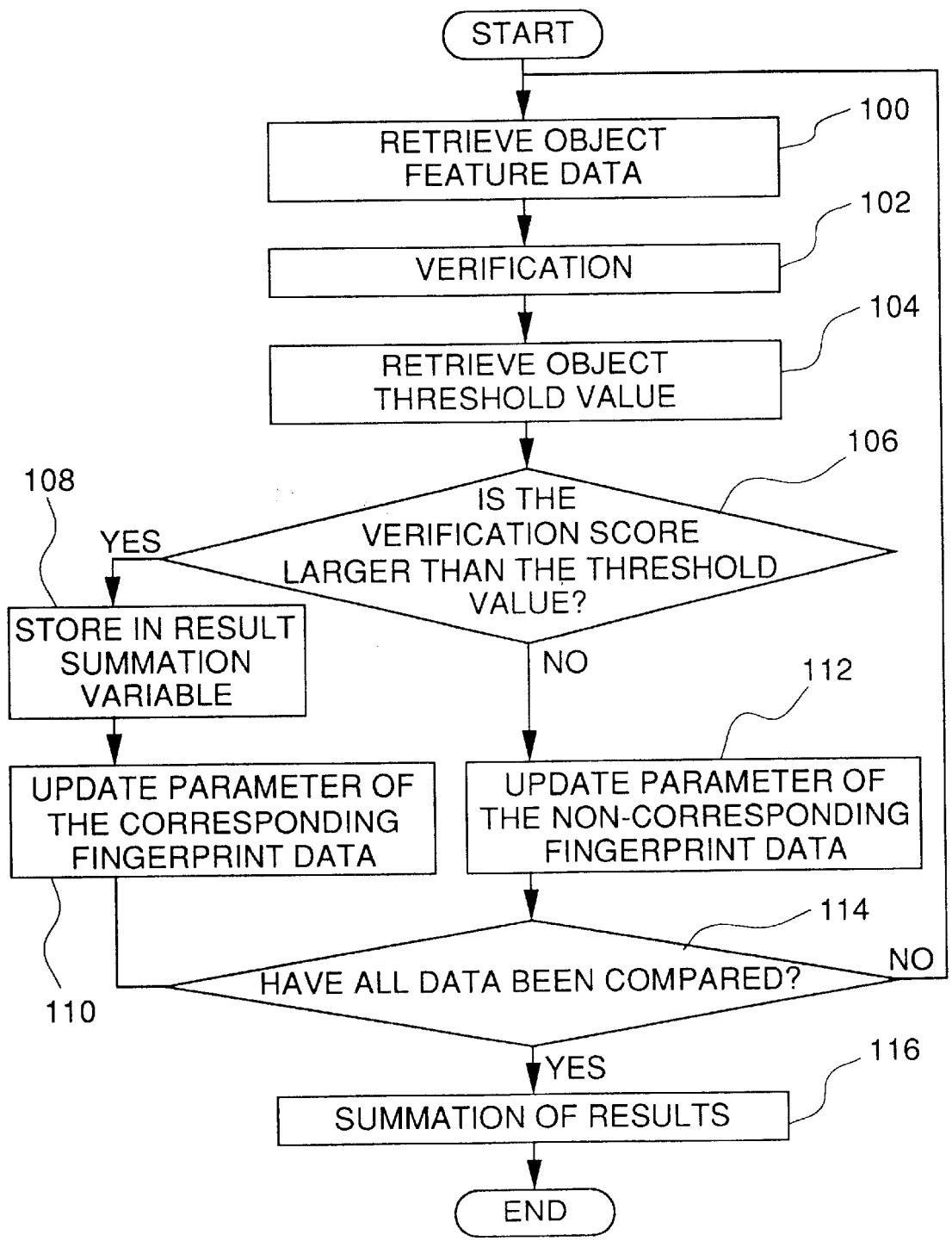
FIG. 10 is a flow chart showing the processing content of the personal identification apparatus shown in FIG. 9.

Next, the operation of the fingerprint verification system according to the embodiment shown in FIG. 9 will be explained referring to the flow chart in FIG. 10. First, the fingerprint image data of one fingerprint from the input device 1 and a feature number that is the designated data specifying the pre-registered feature data of the verification object are input, and sent to the feature extraction device 21.

In the feature extraction device 21, the features from the input fingerprint image data are extracted and quantified. The quantified feature data and the feature number are supplied to the verification device 24 from the feature extraction device 21.

In the verification device 24, the feature data of the verification object is retrieved from the feature data memory unit 31 (step 100) using the feature number that specifies the feature data of the verification object as a key, verification against the feature data extracted from the input fingerprint image data is carried out, and the verification score is calculated (step 102). The verification score obtained in this verification is sent to the acceptance determination device 25.

The acceptance determination device 25 retrieves the separate threshold values from the separate threshold value data memory device 32 using the feature number that specifies the feature data of the verification object as a key, and this is compared with the verification score (step 104 and 106). In step 106, in the case that as a result of comparing the verification score and the separate threshold values the verification score is found to be higher, it is determined that the feature data extracted from the fingerprint image data input from the input device 1 and the feature data retrieved from the separate threshold value data memory unit 32 match, and the result of the comparison is stored in the result summary variable (step 108).

In this case, in step 110, the parameter of the corresponding fingerprint data used as the corresponding feature data is updated. That is, if the verification score of the feature data extracted from the fingerprint image data input from the input device 1 and the pre-registered feature data is Sc, in equation (1), the mean value S1 and dispersion σi of the verification score are updated by equations (2) and (3), the separate threshold values $T_S$ are recalculated. Thereby, the corresponding separate threshold value data stored in the separate threshold value data memory unit 32 is updated.

$$\overline{S}_i = \frac{n\overline{S}_i + S_c}{n+1} \quad (2)$$

$$\sigma_i = \frac{(n-1)\sigma + (S_c - \overline{S}_i)^2}{n} \quad (3)$$

In addition, in step 106, in the case that as a result of the comparison of the verification score and the separate threshold values the verification score is lower, it is determined that the feature data extracted from the fingerprint image data input from the input device 1 and the pre-registered feature data retrieved from the separate threshold value data memory unit 32 do not match, and in this case, in step 112, the parameter of the non-corresponding fingerprint data used as non-corresponding feature data is updated. That is, among the verification scores of the non-corresponding finger print data that is the registered non-corresponding feature data and the verification score Sc, the largest value ti is used as ti, and by equation (1), the separate threshold value $T_S$ is recalculated, and the corresponding separate threshold value data stored in the separate threshold value data memory unit 32 is updated.

The above processing is carried out for all the feature data stored in the feature data memory unit 31 (steps 100 to 112), and when this is complete (step 114), the result summation device 26 sums the data saved in the summation variable. The result summation device 26 determines whether the verification of the fingerprint is a match or mismatch by whether or not the feature data number is stored in the result summation variable, and outputs the determination result to the output device (step 116).

According to the personal identification device of the third embodiment of the present invention, because the separate threshold values are updated based on the verification results of the feature data extracted from the data showing the physical features of the individual who is the verification source and the pre-registered feature data, when carrying out personal identification, it is possible to set the separate threshold value at the optimal value.

Moreover, in a personal identification apparatus that identifies an individual by finding the verification result of the input feature data extracted from data showing the physical feature of the individual who is the verification source and the pre-registered feature data of the verification object, and determining whether or not the degree of similarity obtained by this verification result exceeds the separate threshold value set according to this pre-registered feature data, it is possible to record on a computer readable medium a program that realizes the functions of a personal identification apparatus having a separate threshold value calculation device that calculates the separate threshold values based on the verification score distribution of the feature data extracted from the data showing the physical features of the individual who is the verification source, and the corresponding feature data, and the verification score distribution of the feature data extracted from the data showing the physical feature of the individual who is the verification source and the non-corresponding data.

By reading this program recorded on this recording medium into a computer system and executing it, it is possible to identify a person even when the quality of the input data showing the physical feature of the individual who is the verification source is bad, and the verification score of the pre-registered feature data of the verification object is low.

It is also possible to record on a computer readable recording medium a program for realizing the function of a personal identification apparatus characterized in having an input device that inputs designated data that specifies data showing physical features of the individual and pre-registered feature data of the verification object, a memory device that stores the feature data sets that are extracted from the data showing the physical features of the individual and the separate threshold value data sets that are set according to the respective character data sets, and a data processing device that extracts a plurality of feature data from the data showing the physical features of a plurality of individuals input by the input device during registration, determines the feature data that is to be registered based on the verification results between the plurality of feature data, calculates the separate threshold values by verifying the feature data to be registered and the pre-registered feature data and carrying out statistical processing on the verification data, stores in the memory device the feature data to be registered and the separate threshold value data, and at the same time extracts feature data of the verification source from the data showing the physical features of the individual input from the input device during verification, reads from the memory device the pre-registered feature data of the verification object based on the designated data, verifies the feature data of the verification source and the pre-registered feature data of the verification object, and carries out the identification of the individual based on the comparison results of the separate threshold data.

By reading this program recorded on this recording medium into a computer system and executing it, it is possible to identify a person even when the quality of the input data showing the physical feature of the individual who is the verification source is bad, and the verification score of the pre-registered feature data of the verification object is low.

It is also possible to record on a computer readable recording medium a program for realizing the function of a personal identification apparatus characterized in having an input device that inputs designated data that specifies data showing physical features of the individual and pre-registered feature data of the verification object, a memory device that stores the feature data sets that are extracted from the data showing the physical features of the individual and the separate threshold value data sets that are set according to the respective character data sets, and a data processing device that extracts a plurality of feature data from the data showing the physical features of a plurality of individuals input by the input device during registration, determines the feature data that is to be registered based on the verification results between the plurality of feature data, calculates the separate threshold values by verifying the feature data to be registered and the pre-registered feature data and carrying out statistical processing on the verification data, stores in the memory device the feature data to be registered and the separate threshold value data, and at the same time extracts feature data of the verification source from the data showing the physical features of the individual input from the input device during verification, reads from the memory device the preregistered feature data of the verification object based on the designated data, verifying the feature data of the verification source and the pre-registered feature data of the verification object, and carries out the identification of the individual based on the comparison results of the separate threshold data.

By reading this program recorded on a recording medium into a computer system and executing it, inputting in advance the designated data (ID data) that specifies the individual feature data of the verification is unnecessary.

In a personal identification apparatus having an input device that inputs designated data that specifies data showing physical features of the individual and pre-registered feature data of the verification object, a memory device that stores the feature data sets that are extracted from the data showing the physical features of the individual and the separate threshold value data sets that are set according to the respective character data sets, and a data processing device that extracts a plurality of feature data from the data showing the physical features of a plurality of individuals input by the input device during registration, determines the feature data that is to be registered based on the verification results between the plurality of feature data, calculates the separate threshold values by verifying the feature data to be registered and the pre-registered feature data and carrying out statistical processing on the verification data, stores in the memory device the feature data to be registered and the separate threshold value data, and at the same time extracts feature data of the verification source from the data showing the physical features of the individual input from the input device during verification, reads from the memory device the pre-registered feature data of the verification object based on the designated data, verifying the feature data of the verification source and the pre-registered feature data of the verification object, and carries out the identification of the individual based on the comparison results of the separate threshold data, it is possible to record on a computer readable medium a program for realizing the functions of the personal identification apparatus characterized in the data processing device verifying the feature data of the verification source and the pre-registered feature data of the verification source that has been read, and updating the separate threshold value data based on the comparison result of the separate threshold value data read from the memory device based on the verification score showing the verification results and the designated data.

By reading a program recorded on a recording medium into a computer system, it is possible to set the separate threshold value when carrying out personal identification to an optical value.

In addition, it is possible to record on a computer readable medium a program for realizing the functions of an personal identification apparatus characterized in the separate threshold values being set to the median value of the highest score of the degree of resemblance calculated when verifying the feature data extracted from the data showing the physical features of the individual who is the verification source and the non-corresponding data, and the lowest score in the verification score distribution expected to be obtainable for the feature data extracted from the data showing the physical features of the individual who is the verification source.

By reading a program recorded on this recording medium into a computer system and executing it, it is possible to carry out an acceptance determination in personal identification in line with the score characteristics of the feature data extracted from the data showing the physical features of the respective individuals by producing separate threshold values for the pre-registered feature data depending on the quality of the input data showing the physical features of the individual who is the verification source.

According to the first aspect of the invention, because of this personal identification method that finds the verification result of feature data extracted from input data showing the physical features of the individual who is the verification source and pre-registered feature data of the verification object, and identifies the individual by whether or not the degree of similarity obtained by the verification results exceeds a separate threshold value set to correspond to pre-registered feature data, and wherein this individual threshold value is calculated based on the verification score distribution of the feature data extracted from the data showing the physical features of the individual who is the verification source and the corresponding feature data, and the verification score distribution between the feature data extracted from the data showing the physical features of the individual who is the verification source and the non-corresponding verification data, identification of the individual is possible even in the case that the quality of the input data showing the physical characteristics of the individual who is the verification source is low and the verification score of the pre-registered feature data of the verification object is low.

According to the second aspect of the invention, because the verification result of the feature data extracted from the data showing the physical features of the individual who is the verification source and all pre-registered feature data is found, and the verification score showing the verification results and the separate threshold value data set depending on each type of pre-registered feature data are compared in sequence, and the individual is identified based on this comparison results, inputting in advance the designated data (ID data) that specifies the individual feature data of the verification object is unnecessary.

According to the third aspect of the invention, in the personal identification method according to the first and second aspects, because the separate threshold values are set as the median score of the highest score of the degree of resemblance calculated when verifying the feature data extracted from the data showing the physical features of the individual who is the verification source and the non-corresponding data, and the lowest score in the verification score distribution which is expected to be obtainable for the feature data extracted from the data showing the physical features of the individual who is the verification source, by producing the separate threshold values for the registered feature data depending on the quality of the input data showing the physical features of the individual who is the verification source, it is possible to carry out a determination of acceptance in the personal identification in line with the score characteristics of the feature data extracted from the data showing the physical features of the respective individuals.

According to the fourth aspect of the invention, in the personal identification method according to the first through third aspects, because the separate threshold values are updated based on the verification results of the feature data extracted from the data showing the physical features of the individual who is the verification source and the pre-registered feature data, it is possible to set the separate threshold values when carrying out personal identification at optimal values.

According to the fifth aspect of the invention, because of a personal identification method that finds the verification result of feature data extracted from input data showing the physical features of the individual who is the verification source and pre-registered feature data of the verification object, and identifies the individual by whether or not the degree of similarity obtained by the verification results exceeds a separate threshold value set to correspond to pre-registered feature data, and wherein a separate threshold value calculation device is provided that calculates the separate threshold values based on the verification score distribution of the feature data extracted from the data showing the physical features of the individual who is the verification source and the corresponding feature data, and the verification score distribution of the feature data extracted from the data showing the physical features of the individual who is the verification source and the non-corresponding feature data, identification of the individual is possible even in the case that the quality of the input data showing the physical characteristics of the individual who is the verification source is low and the verification score of the pre-registered feature data of the verification object is low.

According to the sixth aspect, because of the data processing device that extracts a plurality of feature data from the data showing the physical features of a plurality of individuals input by the input device during registration, determines the feature data that is to be registered based on the verification results between the plurality of feature data, calculates the separate threshold values by verifying the feature data to be registered and the pre-registered feature data and carrying out statistical processing on the verification data, stores in the memory device the feature data to be registered and the separate threshold value data, and at the same time extracts feature data of the verification source from the data showing the physical features of the individual input from the input device during verification, reads from the memory device the pre-registered feature data of the verification object based on the designated data, verifying the feature data of the verification source and the pre-registered feature data of the verification object, and carries out the identification of the individual based on the comparison results of the separate threshold data, identification of the individual is possible even in the case that the quality of the input data showing the physical characteristics of the individual who is the verification source is low and the verification score of the pre-registered feature data of the verification object is low.

According to the seventh aspect, because of the data processing device that extracts a plurality of feature data from the data showing the physical features of a plurality of individuals input by the input device during registration, determines the feature data that is to be registered based on the verification results between the plurality of feature data, calculates the separate threshold values by verifying the feature data to be registered and the pre-registered feature data and carrying out statistical processing on the verification data, stores in the memory device the feature data to be registered and the separate threshold value data, and at the same time extracts feature data of the verification source from the data showing the physical features of the individual input from the input device during verification, reads from the memory device in sequence all pre-registered feature data of the verification object, verifies the feature data of the verification source and the read pre-registered feature data of the verification object, totals the comparison results of the verification score showing the verification results and the separate threshold data corresponding to the pre-registered feature data read from the memory device, and carries out the identification of the individual based on the summation results, inputting in advance the designated data (ID data) that specifies the individual feature data of the verification object is unnecessary.

According to the eighth aspect of the invention, because of the personal identification apparatus according to the sixth aspect wherein the data processing device verifies the feature data of the verification source and the read pre-registered feature data of the verification object, and updates the separate threshold value data based on the comparison results of separate threshold data read from the memory device based on the verification score showing the verification results and the designated data, it is possible to set the separate threshold values when carrying out personal identification at optical values.

According to the ninth aspect of the invention, because the separate threshold values are set as the median score of the highest score of the degree of resemblance calculated when verifying the feature data extracted from the data showing the physical features of the individual who is the verification source and the non-corresponding data, and the lowest score in the verification score distribution which is expected to be obtainable for the feature data extracted from the data showing the physical features of the individual who is the verification source, by producing the separate threshold values for the registered feature data depending on the quality of the input data showing the physical features of the individual who is the verification source, it is possible to carry out a determination of acceptance in the personal identification in line with the score characteristics of the feature data extracted from the data showing the physical features of the respective individuals.

According to the tenth aspect of the invention, because of a personal identification apparatus that finds the verification result of feature data extracted from input data showing the physical features of the individual who is the verification source and pre-registered feature data of the verification object, and identifies the individual by whether or not the degree of similarity obtained by the verification results exceeds a separate threshold value set to correspond to pre-registered feature data, and a computer readable medium records a program for realizing the features of the personal identification apparatus having a separate threshold value calculation device that calculates this separate threshold value based on the verification score distribution of the feature data extracted from the data showing the physical features of the individual who is the verification source and the corresponding feature data, and the verification score distribution between the feature data extracted from the data showing the physical features of the individual who is the verification source and the non-corresponding verification data, identification of the individual is possible even in the case that the quality of the input data showing the physical characteristics of the individual who is the verification source is low and the verification score of the pre-registered feature data of the verification object is low by reading into a computer system a program recorded on this recording medium and executing it.

According to the eleventh aspect of the invention, because of a computer readable recording medium that stores a program for realizing the functions of a personal identification apparatus having an input device that inputs designated data that specifies data showing physical features of the individual and pre-registered feature data of the verification object, a memory device that stores the feature data sets that are extracted from the data showing the physical features of the individual and the separate threshold value data sets that are set according to the respective character data sets, and a data processing device that extracts a plurality of feature data from the data showing the physical features of a plurality of individuals input by the input device during registration, determines the feature data that is to be registered based on the verification results between the plurality of feature data, calculates the separate threshold values by verifying the feature data to be registered and the pre-registered feature data and carrying out statistical processing on the verification data, stores in the memory device the feature data to be registered and the separate threshold value data, and at the same time extracts feature data of the verification source from the data showing the physical features of the individual input from the input device during verification, reads from the memory device the pre-registered feature data of the verification object based on the designated data, verifying the feature data of the verification source and the pre-registered feature data of the verification object, and carries out the identification of the individual based on the comparison results of the separate threshold data read from the memory device based on the verification scores showing the verification results and the designated data, identification of the individual is possible even in the case that the quality of the input data showing the physical characteristics of the individual who is the verification source is low and the verification score of the pre-registered feature data of the verification object is low by reading into a computer system a program recorded on this recording medium and executing it.

According to the twelfth aspect of the invention, because of recording on a computer readable medium a program for realizing the functions of a personal identification apparatus having an input device that inputs designated data that specifies data showing physical features of the individual and pre-registered feature data of the verification object, a memory device that stores the feature data sets that are extracted from the data showing the physical features of the individual and the separate threshold value data sets that are set according to the respective character data sets, and a data processing device that extracts a plurality of feature data from the data showing the physical features of a plurality of individuals input by the input device during registration, determines the feature data that is to be registered based on the verification results between the plurality of feature data, calculates the separate threshold values by verifying the feature data to be registered and the pre-registered feature data and carrying out statistical processing on the verification data, stores in the memory device the feature data to be registered and the separate threshold value data, and at the same time extracts feature data of the verification source from the data showing the physical features of the individual input from the input device during verification, reads from the memory device the pre-registered feature data of the verification object based on the designated data, verifying the feature data of the verification source and the pre-registered feature data of the verification object, and carries out the identification of the individual based on the comparison results of the separate threshold data, by reading into a computer system a program recorded on this recording medium and executing it inputting in advance the designated data (ID data) that specifies the individual feature data of the verification object is unnecessary.

According to the thirteenth aspect of the invention, because of the personal identification apparatus according to the sixth aspect having a computer readable recording medium storing a program for realizing the functions of the personal identification apparatus, wherein the data processing device verifies the feature data of the verification source and the pre-registered feature data of the verification object, and updates the separate threshold value data based on the results of a comparison of the verification score showing the verification results and the separate threshold value data read from the memory device based on the designated data, it is possible to set the separate threshold values to optimal values when carrying out personal identification by reading the program stored on the recording medium into a computer system, and executing it.

According to the fourteenth aspect, because of a computer readable recording medium that stores a program for realizing the functions of a personal identification apparatus wherein the separate threshold values are set to the median value of the highest score of the degree of similarity extracted when verifying the feature data extracted from data showing physical features of the individual who is the verification source and the non-corresponding feature data, and the lowest score in the verification score distribution expected to be obtainable for the feature data extracted from the data showing the physical features of the individual who is the verification source, it is possible to carry out a determination of acceptance in the personal identification in line with the score characteristics of the feature data extracted from the data showing the physical features of the respective individuals by producing separate threshold values for pre-registered feature data according to the quality of the data showing the physical features of the individual who is the verification source by reading the program stored on the recording medium into a computer system and executing it.

What is claimed is:

1. A personal identification method comprising the steps of:

finding a verification result of feature data extracted from input data showing the physical features of an individual who is a verification source and pre-registered feature data of the verification object, and identifying the individual by whether or not a degree of similarity obtained by the verification results exceeds separate threshold values set to correspond to said pre-registered feature data, wherein said separate threshold values are calculated based on a verification score distribution of said feature data extracted from the data showing the physical features of the individual who is the verification source and corresponding feature data, and the verification score distribution between said feature data extracted from the data showing the physical features of the individual who is the verification source and non-corresponding verification data, and wherein said separate threshold values are set at the median value of the highest score of the degree of resemblance calculated when verifying said feature data extracted from the data showing the physical features of the individual who is the verification source and the non-corresponding data, and the lowest score in the verification score distribution which is expected to be obtainable for said feature data extracted from the data showing the physical features of the individual who is the verification source.

2. A personal identification method according to claim 1, wherein said separate threshold values are updated based on the verification results of the feature data extracted from the data showing the physical features of the individual who is the verification source and the preregistered feature data.

3. A personal identification apparatus comprising:

a verification result finding device for finding a verification result of feature data extracted from input data showing physical features of an individual who is the verification source and pre-registered feature data of the verification object;

a separate threshold value identifying device for identifying the individual by whether or not the degree of similarity obtained by the verification results exceeds separate threshold values set to correspond to pre-registered feature data; and a separate threshold value calculation device for calculating said separate threshold values based on a verification score distribution of said feature data extracted from the data showing said physical features of the individual who is the verification source and the corresponding feature data, and the verification score distribution of the feature data extracted from said data showing the physical features of the individual who is the verification source and the non-corresponding feature data, wherein said separate threshold values are set at a median value of a highest score of a degree of resemblance calculated when verifying said feature data extracted from the data showing the physical features of the individual who is the verification source and non-corresponding data, and a lowest score in said verification score distribution which is expected to be obtainable for said feature data extracted from the data showing the physical features of the individual who is the verification source.

4. A personal identification apparatus comprising:

an input device for inputting designated data that specifies data showing physical features of an individual and pre-registered feature data of the verification object;

a memory device having a feature data memory unit for storing the feature data sets that are extracted from input data showing physical features of the individual and a threshold value data memory unit for storing separate threshold value data sets that are set according to the respective feature data sets; and a data processing device having a feature extraction means for extracting a plurality of feature data from the input data showing physical features of a plurality of individuals input by said input device during registration, a registered features selection means that determines feature data that is to be registered based on verification results between the plurality of feature data, threshold calculating means which calculates separate threshold values by verifying the feature data to be registered against pre-registered feature data and carrying out statistical processing on the verification data, said data processing device storing in the feature data memory unit of said memory device said feature data to be registered and storing in the threshold value data memory unit the separate threshold value data; said data processing device further having verification means for extracting feature data of the verification source from the data in said feature data memory unit showing the physical features of the individual input from the input device during verification, and acceptance determination means which reads from said threshold value data memory unit of the memory device the pre-registered feature data of the verification object based on said designated data, said verification means and said acceptance determination means verifies the feature data of the verification source against said pre-registered feature data of the verification object, identification of the individual being based on comparison results of separate threshold data read from said memory device based on said verification score showing verification results and said designated data.

5. A personal identification apparatus comprising:

an input device that inputs designated data that specifies data showing physical features of an individual;

a memory device having a feature data memory unit that stores feature data sets that are extracted from input data showing the physical features of the individual and a threshold value data unit that stores separate threshold value data sets that are set according to said respective character data sets; and a data processing device having a feature extraction means for extracting a plurality of feature data from the input data showing physical features of a plurality of individuals input by the input device during registration, a registered features selection means that determines feature data that is to be registered based on verification results between said plurality of feature data, threshold calculating means for calculating separate threshold values by verifying the feature data to be registered and pre-registered feature data and carrying out statistical processing on said verification data, said data processing device storing in the feature data memory unit of the memory device said feature data to be registered and storing in the threshold value memory unit said separate threshold value data; said data processing device further having verification means for extracting feature data of the verification source from the data in said feature data memory unit showing the physical features of the individual input from the input device during verification, acceptance determination means which reads from said threshold value data memory unit of the memory device in sequence pre-registered feature data of the verification object, said verification means and said acceptance determination means verifies said feature data of the verification source and said read pre-registered feature data of the verification object, and result summation means which sums the comparison results of said verification score showing the verification results and said separate threshold data corresponding to the pre-registered feature data read from the memory device, identification of the individual being based on the summation results.

6. A personal identification apparatus according to claim 4 wherein said data processing device further includes means which verifies said feature data of the verification source against said pre-registered feature data of the verification object, and updates said separate threshold value data store in said threshold value data memory unit based on the comparison results of separate threshold data read from the memory device based on said verification score showing the verification results and said designated data.

7. A computer readable recording medium that stores a program that can realize the functions of a personal identification apparatus that finds a verification result of feature data extracted from input data showing physical features of an individual who is a verification source and pre-registered feature data of the verification object, and identifies the individual by whether or not a degree of similarity obtained by the verification results exceeds a separate threshold value set to correspond to pre-registered feature data, and wherein said individual threshold value is calculated based on a verification score distribution of said feature data extracted from the data showing the physical features of the individual who is the verification source and the corresponding feature data, and the verification score distribution between said feature data extracted from the data showing the physical features of the individual who is the verification source and the non-corresponding verification data, and wherein said separate threshold values are set at the median value of the highest score of the degree of resemblance calculated when verifying said feature data extracted from the data showing the physical features of the individual who is the verification source and the non-corresponding data, and the lowest score in the verification score distribution which is expected to be obtainable for said feature data extracted from the data showing the physical features of the individual who is the verification source.

8. A personal identification method according to claim 1, wherein said separate threshold values $T_S$ are calculated as $$T_s = t_i(N) + \frac{\overline{S}_i - k\sigma_i - T_i(N)}{2},$$

where $S_i$ is an average value of the verification score of the corresponding feature data, $\sigma_1$ is the standard deviation of the verification score of the corresponding feature data k is a variance parameter, and $t_i$ is the highest value of the verification score of non-corresponding feature data.

9. A personal identification method according to claim 2, wherein the mean value $S_i$ and dispersion $\sigma_i$ of the verification score are updated by the following calculations $$\overline{S_i} = \frac{n\overline{S_i} + S_c}{n+1} \text{ and}$$

$$\sigma_i = \frac{(n-1)\sigma + (S_c - \overline{S_i})^2}{n},$$

where $S_c$ is pre-registered feature data.

10. A personal identification apparatus according to claim 3, wherein said separate threshold values $T_S$ are calculated as $$T_s = t_i(N) + \frac{\overline{S_i} - k\sigma_i - T_i(N)}{2},$$

where $S_i$ is an average value of the verification score of the corresponding feature data, $\sigma_i$ is the standard deviation of the verification score of the corresponding feature data k is a variance parameter, and $t_i$ is the highest value of the verification score of non-corresponding feature data.

11. A personal identification apparatus according to claim 10, wherein said separate threshold values are updated based on the verification results of the feature data extracted from the data showing the physical features of the individual who is the verification source and the preregistered feature data.

12. A personal identification apparatus according to claim 11, wherein the mean value $S_i$ and dispersion $\sigma_i$ of the verification score are updated by the following calculations $$\overline{S_i} = \frac{n\overline{S_i} + S_c}{n+1} \text{ and}$$

-continued $$\sigma_i = \frac{(n-1)\sigma + (S_c - \overline{S_i})^2}{n},$$

where $S_c$ is pre-registered feature data.

13. A computer readable recording medium according to claim 7, wherein said separate threshold values $T_S$ are calculated as $$T_s = t_i(N) + \frac{\overline{S_i} - k\sigma_i - T_i(N)}{2},$$

where $S_i$ is an average value of the verification score of the corresponding feature data, $\sigma_i$ is the standard deviation of the verification score of the corresponding feature data k is a variance parameter and $t_i$ is the highest value of the verification score of non-corresponding feature data.

14. A computer readable recording medium according to claim 13, wherein said separate threshold values are updated based on the verification results of the feature data extracted from the data showing the physical features of the individual who is the verification source and the preregistered feature data.

15. A computer readable recording medium according to claim 14, wherein the mean value $S_i$ and dispersion $\sigma_i$ of the verification score are updated by the following calculations $$\overline{S_i} = \frac{n\overline{S_i} + S_c}{n+1} \text{ and}$$

$$\sigma_i = \frac{(n-1)\sigma + (S_c - \overline{S_i})^2}{n},$$

where $S_c$ is pre-registered feature data.

* * * * *